(No Model.) 8 Sheets—Sheet 1.

J. H. REED.
BUTTON HOLE STITCHING AND BARRING MACHINE.

No. 378,217. Patented Feb. 21, 1888.

Fig. 1.

WITNESSES.
INVENTOR.

(No Model.) 8 Sheets—Sheet 2.
J. H. REED.
BUTTON HOLE STITCHING AND BARRING MACHINE.
No. 378,217. Patented Feb. 21, 1888.

(No Model.) 8 Sheets—Sheet 3.
J. H. REED.
BUTTON HOLE STITCHING AND BARRING MACHINE.

No. 378,217. Patented Feb. 21, 1888.

WITNESSES. INVENTOR.

(No Model.) 8 Sheets—Sheet 4.

J. H. REED.
BUTTON HOLE STITCHING AND BARRING MACHINE.

No. 378,217. Patented Feb. 21, 1888.

WITNESSES. INVENTOR.

(No Model.)  8 Sheets—Sheet 5.

J. H. REED.
BUTTON HOLE STITCHING AND BARRING MACHINE.

No. 378,217.  Patented Feb. 21, 1888.

WITNESSES.  INVENTOR.

(No Model.) 8 Sheets—Sheet 6.

J. H. REED.
BUTTON HOLE STITCHING AND BARRING MACHINE.

No. 378,217. Patented Feb. 21, 1888.

WITNESSES.
J. M. Dolan.
Fred. B. Dolan.

INVENTOR.
James H. Reed,
by his attys
Clarke & Raymond (No Model.)

J. H. REED.
BUTTON HOLE STITCHING AND BARRING MACHINE.

No. 378,217. Patented Feb. 21, 1888.

Fig. 21.

WITNESSES.
J. M. Dolan
Fred. B. Dolan

INVENTOR.
James H. Reed
by his attorneys
Clark & Raymond

Fig. 22.

UNITED STATES PATENT OFFICE.

JAMES H. REED, OF LYNN, MASSACHUSETTS, ASSIGNOR, BY MESNE ASSIGNMENTS, TO THE GLOBE BUTTON-HOLE MACHINE COMPANY, OF KITTERY, MAINE.

BUTTON-HOLE STITCHING AND BARRING MACHINE.

SPECIFICATION forming part of Letters Patent No. 378,217, dated February 21, 1888.

Application filed December 16, 1886. Serial No. 221,721. (No model.)

*To all whom it may concern:*

Be it known that I, JAMES H. REED, of Lynn, in the county of Essex and State of Massachusetts, a citizen of the United States, have invented a new and useful Improvement in Button-Hole Stitching and Barring Machines, of which the following is a full, clear, and exact description, reference being had to the accompanying drawings, forming a part of this specification, in explaining its nature.

The invention relates to a button-hole stitching and barring machine having two needles, one of which is supported above the work-plate and arranged to be continuously reciprocated in a straight line or in the same path during its entire operation in stitching both the sides and eye and the bar, and the other of which is supported below the work-plate and is adapted to be reciprocated upon a straight path or given line during the sewing or stitching of the sides and eye of the button-hole and during the stitching of the bar upon a path or line parallel to that upon which it moves during the stitching of the sides and eye and farther removed from the path or line of reciprocation of the upper needle.

The invention further comprises the combination, in a button-hole stitching and barring machine, of two needles, one arranged above the work-plate and the other below it, and to means for reciprocating or moving them at a uniform distance apart during the stitching of the sides and eye of the button-hole, and for transferring or moving one needle in relation to the other automatically at the completion of the stitching of the second side of the button-hole, so as to increase the distance or space between the two needles, and without interrupting their reciprocation, so that the stitching of the bar continues, after the end of the stitching of the last side, automatically and without stopping the machine or reducing its speed.

It further relates to the combination, in connection with needles having these movements, of a work-plate having an intermittent feed movement imparted to it during the stitching of the sides and eye of the button-hole.

It further relates to the combination, with needles having the movements specified, of the work-plate and a thread-carrier or looping device above the work-plate and a thread-carrier or looping device or mechanism below.

It further relates to the combination of needles having these movements with the movable work-plate and mechanism placed to be actuated by the work-plate at the end of the stitching of the last side of the button-hole to cause a change in the position of one needle in relation to the other, whereby the distance between the needles is increased.

It further relates to various features of construction and organization which will hereinafter appear.

The machine as illustrated is organized so that the lower needle is during the stitching of the sides and eye caused to be reciprocated through the button-hole slit or hole, if the button-hole has been previously cut, and the upper needle is caused to penetrate the material parallel with the side of the button hole or slit, and the upper thread is fed by the upper needle through the material to a position to be seized by the under or lower looping devices, which form a loop through which the lower needle carrying the lower thread passes, and the lower needle carries the thread upward through the button-hole slit to a position above the material, and the upper looping mechanism then transfers the lower thread and forms a loop, through which the upper needle with the upper thread is then caused to be moved.

The clamp-plate is of the ordinary form of construction and is like that described and shown in my application filed February 1, 1886, Serial No. 190,525, and is moved or fed by mechanism substantially like that described in my said application and in Patent No. 344,678, dated June 29, 1886, to Phelps.

In the drawings, Fig. 13 is a view in section and elevation to represent the relation which the needles and looping devices bear to each other while stitching the sides and eye of the button-hole. Fig. 15 illustrates the position which the needles and looping devices bear to each other during the sewing of the bar. Figs. 18, 19, and 20 are views illustrating various positions of the needle and upper looper in relation to each other, hereinafter referred to.

A is the upper needle. It has the eye $a$ and is carried by the needle-bar $a'$, which is reciprocated by means of a cam-groove, $a^2$, in the cam-disk $a^3$ at the front end of the main shaft $a^4$, the needle-bar having a cam-pin which enters the cam-groove. The needle is moved upon a straight vertical path.

B is the lower needle. It is represented as straight and having the eye $b$ at its point. It is supported by the needle-bar $b'$, which is in the form of a slide, held by a block, $b^2$, which is made movable to transfer the lower needle at the end of the stitching of the last side of the button-hole to locate the needle, so that it may be reciprocated or moved to a greater distance from the path of the upper needle than that in which it is reciprocated or moved during the stitching of the sides and eye. The manner of moving this block will be hereinafter specified.

The needle-bar $b'$ is reciprocated or moved by means of the bent lever $b^3$, cam-groove $b^4$ in the cam-disk $b^5$ on the vertical shaft $b^6$, the slide-bar $b^7$, which has a cam-pin at one end arranged to enter the cam-groove $b^4$, and the link $b^8$, which connects the slide with one arm of the rock-lever. Both the cam $b^4$ and the cam $a^2$ are timed to give the needles the desired movements in relation to each other and such periods of rest as may be required for properly operating the thread carrying and looping devices.

C is the bed of the machine.

$c$ is the bed-plate; $c'$, the clamp-plate; $c^2$, the work-spreading clamping-jaws carried by the clamp-plate. $c^3$ is the button which forms the throat of the machine, and which has a guideway or recess which receives the inner edge of the clamp-plate about its central hole. The clamp-plate has a spring-pin, $c^4$, which engages the worm-wheels $c^5$ $c^6$, and intermediate feeding-fingers, $c^7$. This spring-pin travels in the guide-slot $c^8$ in the work-plate. The worm-wheels $c^5$ $c^6$ are connected by means of the bevel-gear $c^9$, which carries the feed-fingers $c^7$, and the worm-wheel $c^6$ has a ratchet-wheel, $c^{10}$, and motion is communicated to it, and therefore to the worm-wheels, by means of the pawl $c^{11}$, which is rotated by the crank $c^{12}$ on the lower end of the shaft $b^6$ and the connecting-rod $c^{14}$. The crank-pin $c^{15}$ is carried by a slide-block, $c^{16}$, movable radially in a groove, $c^{17}$, in the crank-disk $c^{18}$, so that the length or extent of movement of the feed-pawl may be varied by changing the position of the crank-pin in relation to the center of the shaft $b^6$.

Figure 21:
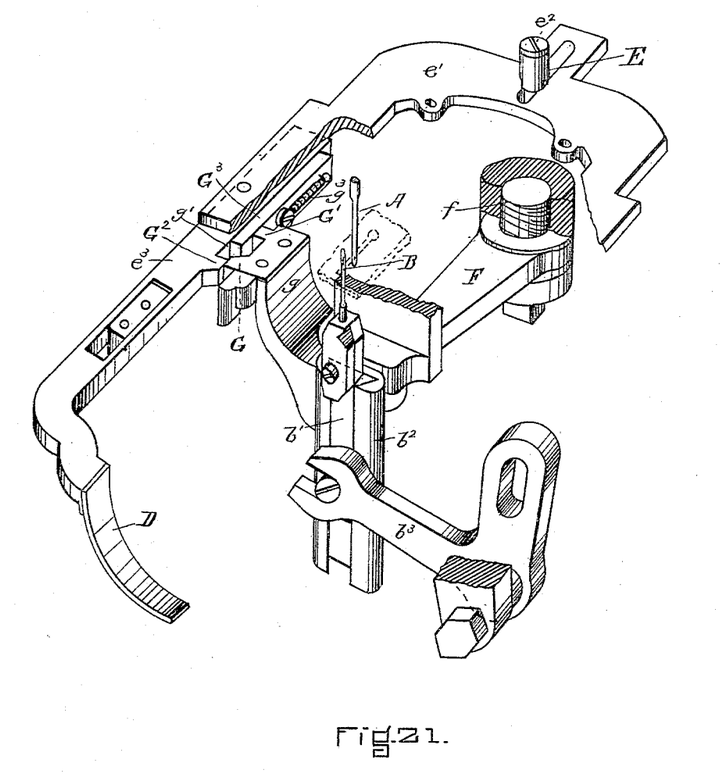
Fig. 21 is a view in perspective to illustrate the relation of the two needles to each other during the stitching of the sides and eye and the mechanism whereby the lower needle is adapted to be moved automatically at the end of the stitching of the last side of the button hole.
Figure 22:
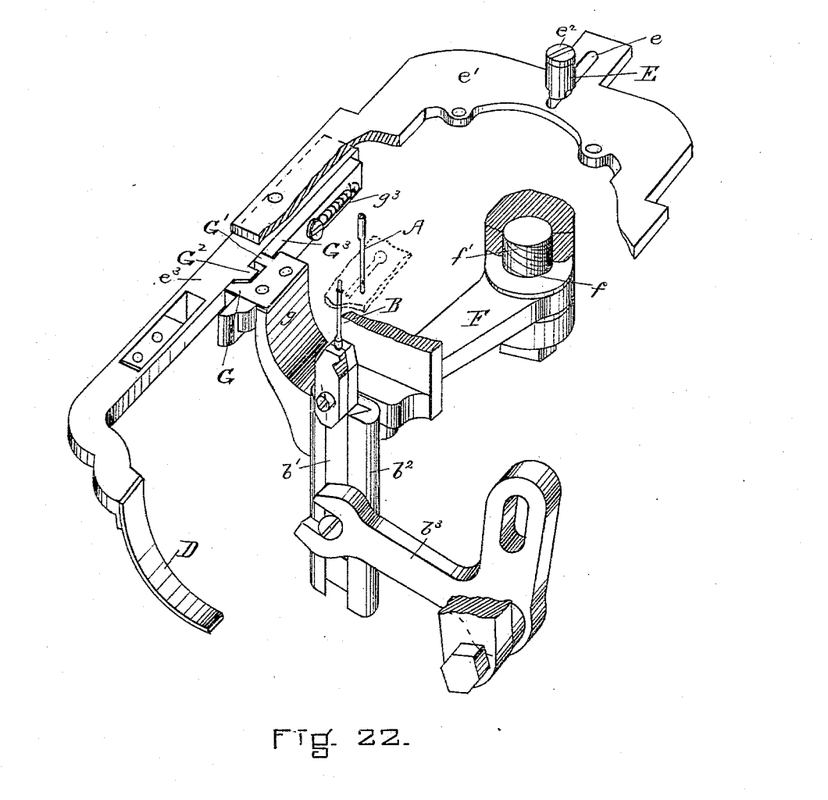
Fig. 22 is a perspective view of the same parts, representing the lower needle as moved out into its barring position and the relation which the parts then bear to each other.

As the button-hole is presented to the sewing mechanism, the stitch is arranged to begin at the end of one side, to follow along that side to the eye, and about the eye along the other side to the end of that side, and the barring then takes place. During the stitching of the sides and eye the clamp-plate has an intermittent feeding movement. At the end of the stitching of the last side this movement is entirely stopped, or, if continued, is reduced considerably in extent. This stopping or changing of the feed is provided by means of a ratchet-covering plate, D, which is moved into position over the teeth of the ratchet-wheel to be interposed between the pawl and the teeth, so that the feed-pawl, instead of engaging the teeth, rides on this covering-plate, and if the covering-plate is arranged so as to expose a section of the ratchet within the limit of the movement of the pawl, then the feed movement will not cease entirely, but will be limited or reduced in extent. The movement of this covering-plate over the ratchet-wheel, or between the feed-pawl and the ratchet-wheel, is produced or caused by the contact of the edge of the clamp-plate $c'$ with a slide-block, E, arranged to project through the guide slot $c^8$ and to slide therein, and its clamp-pin enters the slot $e$ in the slide-plate $e'$, to which it is fastened by the nut $e^2$. The slide-plate $e'$ is secured to the under side of the bed of the machine, so as to slide or be movable, and carries an arm, $e^3$, which holds the ratchet-wheel-covering plate D. This movable plate is also utilized to cause the block $b^2$, carrying the lower needle bar, $b'$, to be automatically moved at the end of the stitching of the last side of the button-hole, and this result is obtained by causing the block $b^2$ to be held in one position by a latch or lock, which is adapted to be moved by the slide-plate to permit a spring to throw the said block $b^2$ sufficiently to change the position of the needle-bar and needle. I have therefore shown the block $b^2$ as carried at the end of a horizontal arm, F, which is pivoted at its end $f$, by the pivot or stud $f'$, (see Figs. 21 and 22,) to the under side of the bed of the machine, and there is arranged to act upon this arm to move it in one direction—namely, in a direction to move the lower needle away from the upper needle—a spring, $f^2$, which is represented as a coiled spring surrounding the stud, one end of which is fastened to the stud and the other end of which is fastened to the arm.

Figure 1:
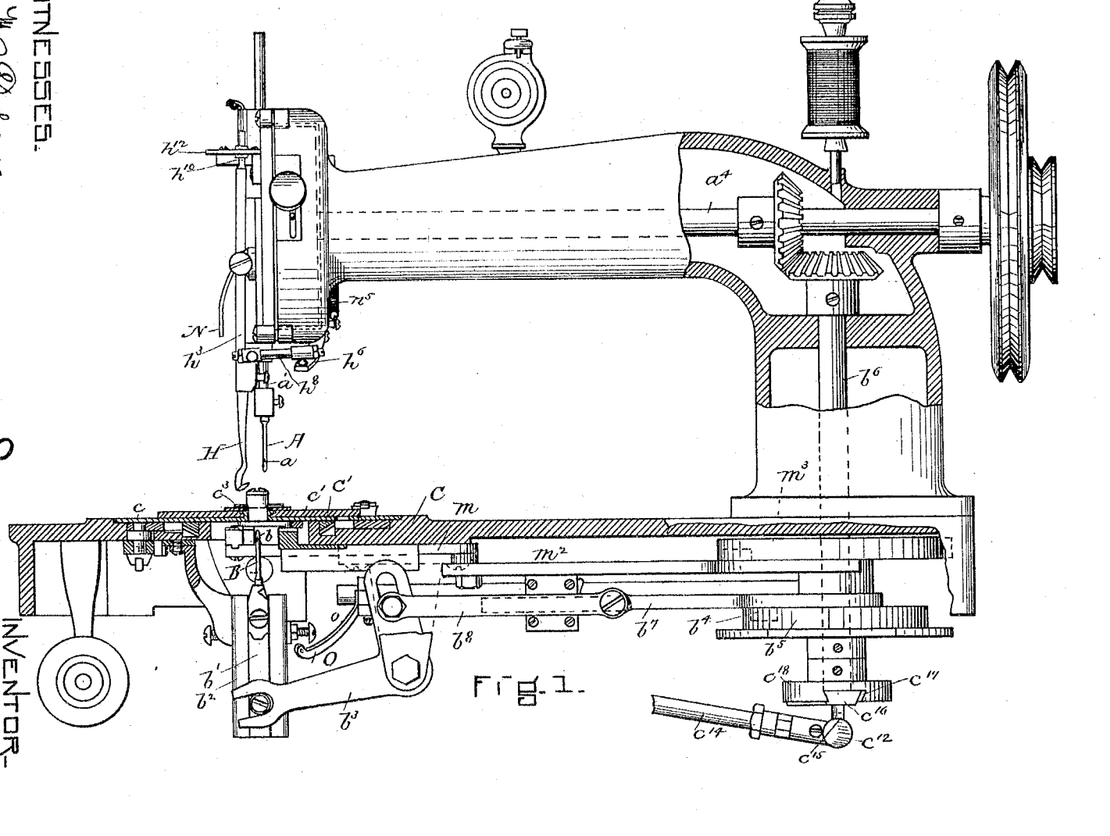
Figure 1 is a view, part in front elevation and part in vertical section, illustrating a machine containing the features of my invention.
Figure 2:
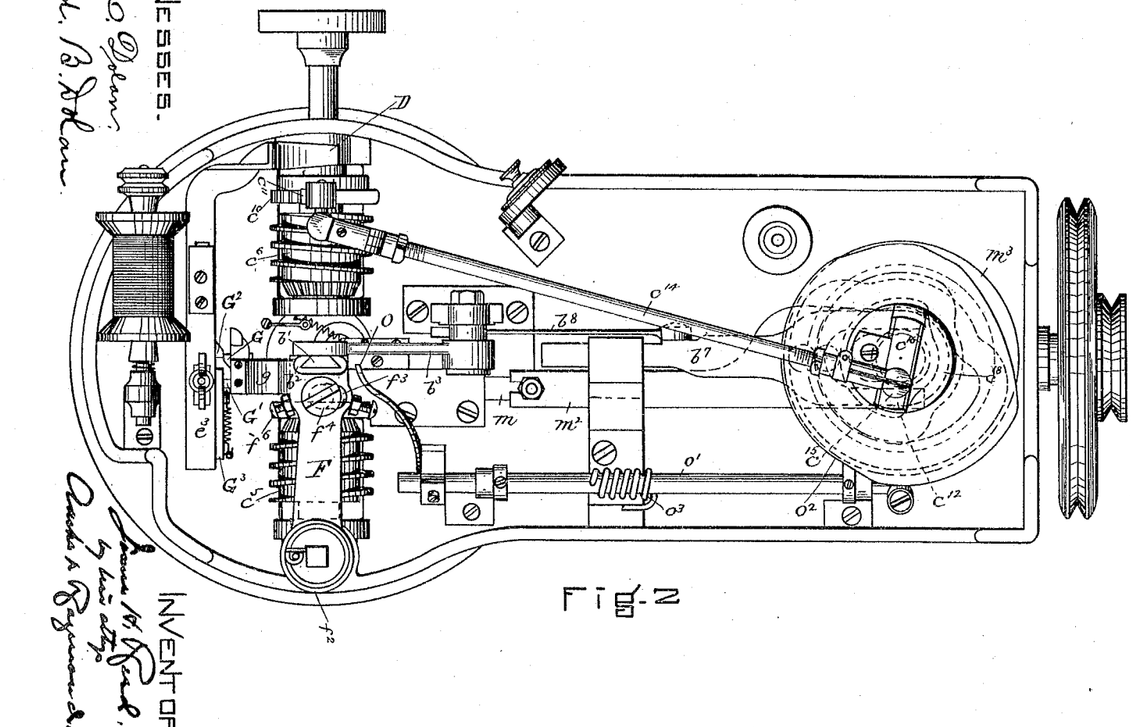
Fig. 2 is a plan view thereof inverted.
Figures 3, 4, 5:
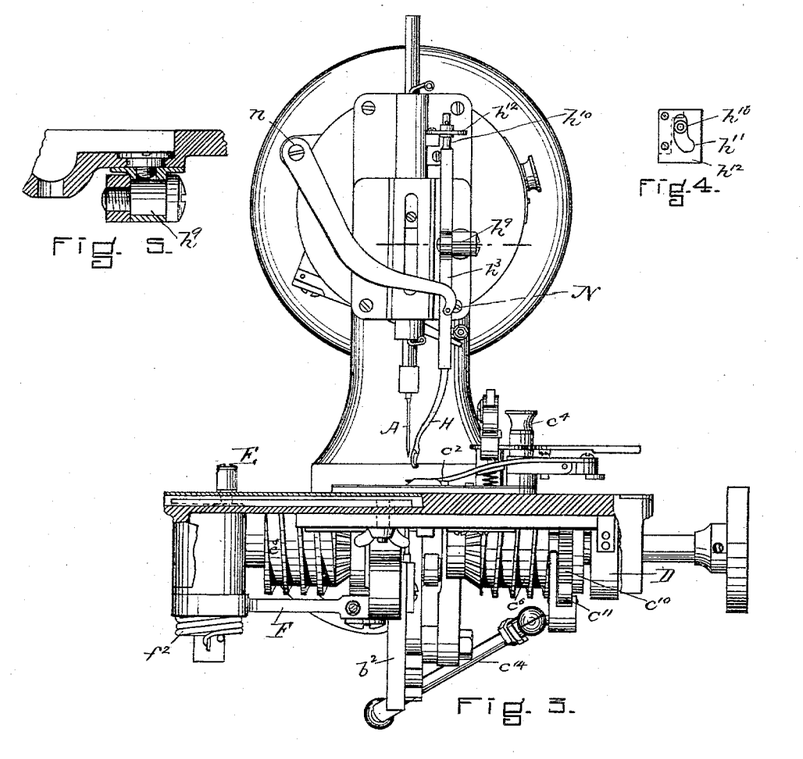
Fig. 3 is a view in end elevation.
Figs. 4, 5, 6, and 7 are detail views illustrating a part of the mechanism for operating the upper looper.
Figure 6:
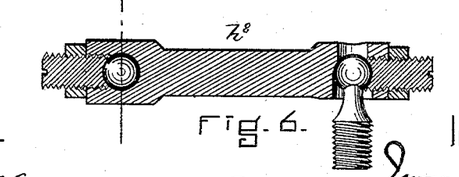
Figure 7:
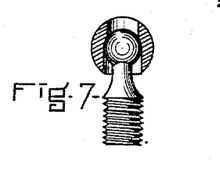

The extent of movement of the end of the arm F, and therefore of the needle B, is adjusted or varied by providing the arm F with a slot or enlarged hole, $f^3$, which receives the stationary headed stud $f^4$, (see Fig. 2,) and by means of the adjusting-screws $f^5 f^6$, which are arranged to screw through the sides of the arm into the hole $f^3$, the ends of which act as stops, in connection with the stud, in limiting the extent of movement of the arm.

The latching or locking device for holding the arm F in a fixed position during the stitching of the sides and eye, and for releasing it to permit the spring to move it laterally to increase the distance between the two needles at the end of the sewing of the last side, comprises the two sections or parts G G' upon an arm, $g$, extending horizontally from the arm F, and the sections or parts $G^2 G^3$, which are carried by the arm $e^3$ of the slide-plate $e'$. The section or part G is a wedge-block. The section or part G' is an under needle-bar block, which, when the parts are in position for stitching the sides and eye of the button-hole, rests against the section or part $G^3$, (see Fig. 21,) and maintains the arm F in a fixed or stationary position until the slide-plate $e'$ is moved by the contact of the clamp-plate with the stud or pin E, when the arm $e^3$ is moved sufficiently to move the section or block $G^3$ past or beyond the under needle-bar block, G', which, with the arm F, is then moved by the spring $f^2$ until it comes in contact with the edge of the arm $e^3$. (See Fig. 22.) This results in changing the position of the under needle-bar block, $b^2$, and the block is held in this position, fixed or stationary, by the spring $f^2$ during the stitching of the bar.

Figure 12:
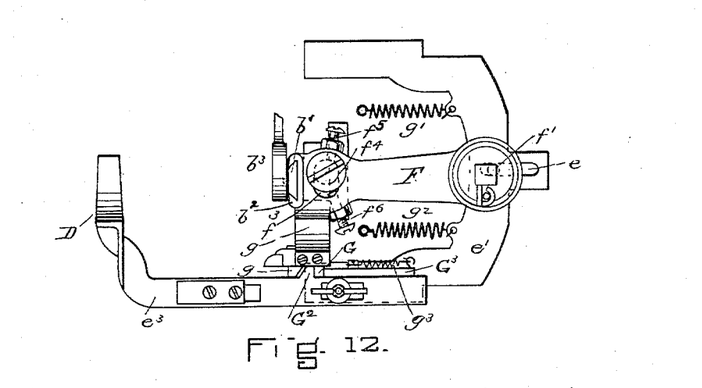
Fig. 12 is a plan view of the mechanism for automatically moving the lower needle to its barring position.

Upon the removal of the clamp-plate to its original position it is desirable to automatically return the lower needle and its bar $b^2$ to their original position, or to a position for stitching the sides and eye of the next button-hole, and this is accomplished by causing the slide-plate $e'$ and its arm $e^3$ to be automatically returned to their original position upon the release of the pin E by the removal of the clamp-plate. This movement of the plate and arm is produced by the springs $g' g^2$, (see Fig. 12,) and this causes the section or part $G^2$ of the arm $e^3$, which is a wedge-block, to ride against the wedge-block G and push the projection $g$ and arm F inward against the pressure of the spring $f^2$. In order that this movement may take place—that is, in order that the wedge-block $G^2$ may ride upon the wedge G and return the arm $g$, and therefore the lower end of the needle B, to their original position—it is necessary that the block $G^3$ be movable upon the side of the plate $e^3$; otherwise either the wedge-block $G^2$ could not come in contact with the wedge G after the block G' had been moved off the end of the block $G^3$ or there would not be the rapid movement of the arm $g$ necessary in order to increase the distance between the two needles preparatory to taking the barring-stitch, as when the block $G^3$ was moved past the projection G' it would simply bring the two inclined surfaces of the blocks G G' together; but by making the block G movable upon the arm $e^3$, in opposition to the stress of the spring $g^3$, upon the movement of the plate $e^3$ the block $G^3$ is held stationary by the projection G', while the projection and the arm $g$ are being pushed away from the plate $e^3$, by the wedge-surfaces of the blocks G' $G^2$, until the block G' has been moved from the plate $G^2$ sufficiently to permit the spring $g^3$ to throw the block $G^3$ between its end and the edge of the plate, when the parts assume the position represented in Fig. 21.

The wedge-blocks G $G^2$ should be a trifle longer than the block G', in order that they may move the block G' inward sufficiently to permit the movement of the slide-block $G^3$ before they clear each other. This transferring movement of the lower needle-block takes place without stopping the operation of the stitch-forming devices, so that the stitching of the eye and sides is followed without interruption by the stitching of the bar.

The lower needle-bar, preferably, is moved sufficiently to bring the needles into a position to make a barring-stitch about twice the length of the side stitch. It is also necessary that the needle B be transferred or moved quickly at the desired instant, and for this reason, especially, the slide-block $G^3$ is used, because it enables me to bring into position a support from the end of which the under needle-bar block, G', may immediately move upon the movement of the slide-plate $e'$, and it also enables me to bring such a support into such a position in relation to the wedge-block $G^2$ that this movement of the block G' shall not take place until the wedge-block G has cleared the wedge-block $G^2$, so that their inclines shall not come together during this transferring movement of the needle, so that the movement is made as quickly as it is possible to make it by means of a spring. The wedge-blocks are used for the purpose of moving the under needle-bar block back to its original or normal position.

I would say that I do not confine myself to the specific mechanism herein described connecting the slide plate or latch operated by the clamp-plate with the movable arm carrying the lower needle, as there are many mechanical equivalents for the mechanism which I have described for accomplishing this feature of my invention—namely, the automatic release of the block carrying the needle-bar at the end of the stitching of a side to bring the needle into a new position without stopping the machine, and so as to permit the sewing to continue and the barring-stitches to be formed.

Figure 8:
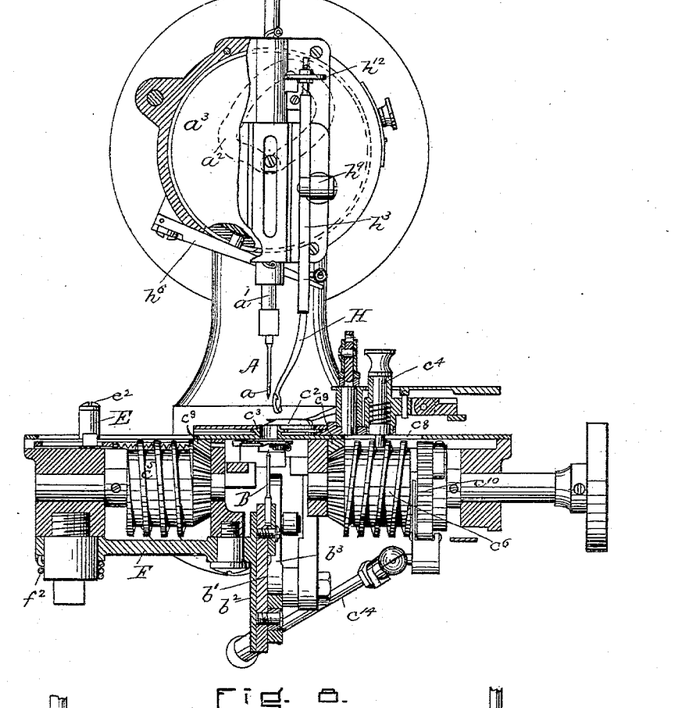
Fig. 8 is a view, part in cross-vertical section and part in elevation, to further illustrate the construction and operation of the machine.
Figure 9:
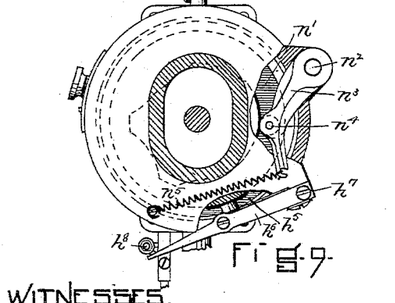
Figs. 9 and 10 are views to further illustrate the construction and organization of the devices for operating the upper looper.
Figure 10:
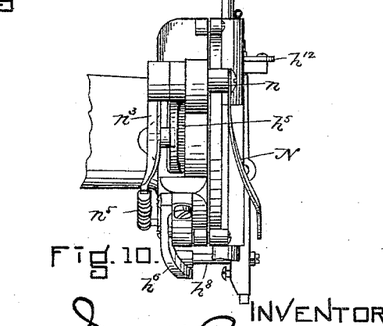
Figure 11:
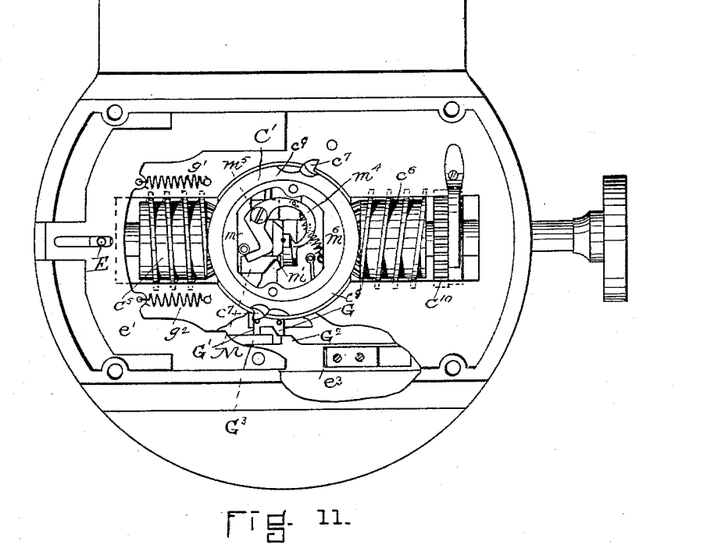
Fig. 11 is a plan view below the work-plate of the machine.
Figures 13, 15, 18, 19, 20:
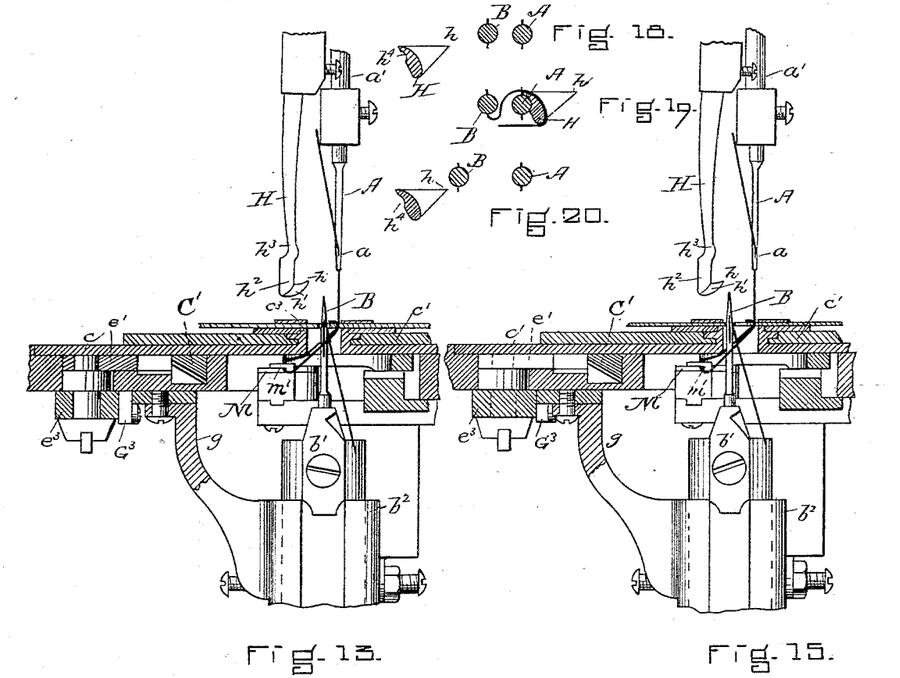
Figure 14:
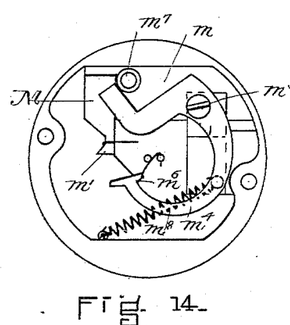
Fig. 14 is a view in plan, inverted, showing the lower looping devices.
Figure 16:
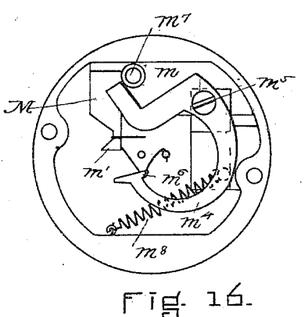
Fig. 16 is a plan view, inverted, of the lower looping devices to show that the extent of their movement is not modified or changed during the sewing of the barring-stitch. Fig.
Figure 17:
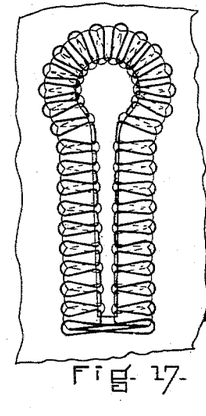
Fig. 17 is a plan view, enlarged, of a complete button-hole.

The looping devices are given such a range or extent of movement that it is not necessary to change their relation to each other for any change in position of the two needles. The upper looping device, H, is adapted to take the lower thread from the lower needle and to carry it horizontally and deliver it in the form of a loop beneath the point of the upper needle and in its path. This upper looper I have shown in Figs. 13, 15, 18, 19, and 20. It has a point $h$, which engages the lower thread, or passes between it and the side of the lower needle. This point is formed upon the end of a foot which has the rounded or curved upper surface, $h'$, and the curved side surface, $h^2$. This foot is in front of the arm $h^3$. Upon the rear or back side of the arm $h^3$ there is formed a vertical recess or groove, $h^4$, and the arm above the foot is made somewhat long horizontally. This looper is provided with a compound movement in relation to the two needles. It is first advanced in a straight line or path to engage the thread of the lower needle, and, having taken it, it is then moved upon the arc of a circle, so as to bring the vertical groove or recess $h^4$ upon the other side of the upper needle, or to the position shown in Fig. 19, and this causes the loop to be opened or spread and to be held open or spread during the downward movement of the upper needle, which then immediately takes place, upon a line with the vertical groove or recess. This combined movement is imparted to the looper by means of the cam-groove in the cam-disk $h^5$, (see Figs. 8 and 9,) the lever $h^6$, which is pivoted at $h^7$, and which has a cam-pin which enters the cam-groove, and which is connected with the looper-arm $h^3$ by means of the link $h^8$, having a ball-joint connection with the lever and also with the arm $h^3$. The looper-arm $h^3$ is attached by a compound pivot, $h^9$, (which in effect makes a universal joint,) to the head of the machine, and its upper end, $h^{10}$, enters a cam-groove, $h^{11}$, in the plate $h^{12}$, so that its end is caused to be moved first in a straight line and then in a curved line, the motion being imparted to it by means of the cams, levers, and link above indicated.

The lower looping mechanism comprises two parts—namely, a slide, $m$, carrying the block M, having a point, $m'$, which is moved across the side of the upper needle to engage the upper thread and carry it from the needle. This slide is attached to a bar, $m^2$, which is reciprocated by means of a cam-groove in the cam-disk $m^3$ upon the shaft $b^6$, the bar having a cam-pin which extends into the cam-groove. There is also used in connection with this thread-engaging hook the loop-spreading arm $m^4$, which is pivoted at $m^5$, and the point $m^6$ of which is arranged to be moved transversely the line of the hook by the pin $m^7$ upon the slide $m$, so that as the thread is engaged by the hook and moved away from the upper needle the spreading-point is also caused to be moved laterally to engage the thread and open the loop, and the loop is held by the upper needle, the loop-engaging point $m$, and the spreading-point $m^6$ until the lower needle has entered it, when the parts are returned to their original position—the point $m^6$—by means of the spring $m^8$.

Any suitable take-ups may be used. The upper thread take-up comprises an arm, N, which is pivoted at $n$ and is moved by the cam $n'$ on the cam-disk $a^3$, with which it is connected by means of the stud $n^2$ and lever $n^3$, which has a cam-pin, $n^4$, bearing against the cam. A spring, $n^5$, attached to the end of the lever $n^3$, serves to hold the cam pin or projection in contact with the cam. The lower take-up, O, is made in the form of an arm, $o$, attached to the shaft $o'$, which is operated by the edge cam, $o^2$, and spring $o^3$.

The ratchet-covering and pawl-disengaging plate is made somewhat inclined upon its inner or working edge, so that its outer end shall ride over the ratchet-teeth first, and thus move slightly behind the pawl, so that the pawl, on its backward movement, is caused to ride on to the surface of the plate.

In operation the work is placed on the clamp-plate and clamped, the machine started, and the lower needle enters the button hole slit and presents the lower thread to the upper looper, which engages it and carries it in the form of a loop to the upper needle, which passes through it and the material close to the edge of the button-hole slit. The upper thread is in turn taken by the lower looping devices and presented to the lower needle, which has been moved down to its original position, and the lower needle passes through its loop, taking the lower thread with it, and again presents its thread to the upper looper, and this action continues, the material being fed by the clamp-plate forward, the clamp-plate having an intermittent forward movement only, and the needles moving upon the same lines and the same distance apart in relation to each other until they have sewed one side, the eye, and the other side. At the end of the stitching of the other side the clamp-plate trips the spring-held arm carrying the lower needle-bar, and it is then moved by the spring laterally, so that its needle, instead of continuing to move through the button-hole slit, is caused to be moved through the material upon the other side of the slit. Each needle will then be separated by a space about double that which formerly separated them, and this is done without interrupting the operation of the sewing devices, and the next stitch, which is formed after the lower under needle-bar block has been thus transferred, is about twice the length of the stitches previously made and is the barring-stitch, and as many of them will be taken as desired—generally from three to five or six. The machine is then stopped, the clamp-plate returned to its original position, and the movement of the clamp-plate releases devices which causes the lower under needle-bar block to be moved back again automatically to its original position. In order that the lower needle may be on the same line with the upper in its two positions, I have hung the under needle-bar block arm F somewhat off a center taken from the center of the button to the center of the pivot, so that in transferring it shall be moved past the center to as great a distance upon the other side thereof, and this causes the lower needle to be still maintained in the same straight line with the upper needle, and this will not be the case if the arm carrying the under needle-bar block were pivoted upon a center with the center of the throat.

Having thus fully described my invention, I claim and desire to secure by Letters Patent of the United States—

1. In a button-hole stitching and barring machine, the combination of a clamp-plate and means for providing it with an intermittent feed movement with a needle and means for reciprocating it continuously in the same direction or vertical path or plane and another needle and means for reciprocating it first in one vertical path or plane during the stitching of a certain part of the button-hole and for moving the needle and continuing its reciprocation upon another vertical path or plane during the stitching of the bar of the button-hole, and suitable looping devices, substantially as and for the purposes described.

2. The combination of the clamp-plate and means for providing it with an intermittent feed movement, the needles and mechanism for reciprocating them upon parallel planes or in parallel paths during the stitching of the sides and eye of the button-hole, and devices for increasing the space between them without interrupting their movement or reciprocation, with proper looping devices and devices for automatically stopping or limiting the feed movement of the clamp-plate at the instant that the change in the relative positions of the needles takes place, substantially as described.

3. The combination of the clamp-plate and means for imparting to it an intermittent feed movement, the upper needle, A, and its needle-bar $a'$ and cam for operating the same, the lower needle, B, and its needle-bar $b'$ and cam for operating the same, and the needle-bar block $b^2$ and means for moving said block laterally and for holding it in its new position, substantially as described.

4. The combination of the upper needle, A, and means for reciprocating it, the lower needle, B, and means for reciprocating it, the looper H, having the point $h$, the rounded surfaces $h'$ $h^2$, and the groove $h^4$, and means for moving the same, substantially as described.

5. The combination of the upper needle, A, and means for reciprocating it, the looper-arm $h^3$, having the point $h$, the rounded surfaces $h'$ $h^2$, and groove $h^4$, the operating-cams $h^5$ $h^{11}$ and intermediate devices connecting the cams with the looper-arm, and the lower eye-pointed needle, B, and means for reciprocating it, substantially as described.

6. The combination of the needle A and means for reciprocating it, the looper-arm $h^3$, pivoted by a pivot, $h^9$, the cam $h^5$, the lever $h^6$, the link $h^8$, connecting the end of the lever with the looper-arm $h^3$, the plate $h^{12}$, having the cam-slot $h^{11}$, and the end $h^{10}$ of the looper-arm which enters said cam-slot, substantially as described.

7. The combination of the reciprocating eye-pointed needles A B and means for varying their relations to each other automatically during their operation, with upper and lower thread-carrying and loop-forming devices having an invariable throw or movement for the two positions of the needles, and the clamp-plate provided with means for giving the same an intermittent feed movement, substantially as described.

8. The combination of the clamp-plate provided with means for giving the same an intermittent feed movement during the stitching of the sides and eye of the button-hole, the reciprocating upper straight eye-pointed needle, A, the reciprocating lower straight eye-pointed needle, B, and means for moving the same, whereby it is reciprocated upon one plane, during the stitching of the sides and eye of the button-hole, and then automatically transferred to a new position to increase the distance between it and the needle A and reciprocated, and a loop-forming device above the clamp-plate, and a loop-forming device below the clamp-plate, both of which have invariable movements for both positions of the needle, substantially as described.

9. The combination of the reciprocating needle A, the reciprocating needle B, the needle-bar $b'$, its under needle-bar block, $b^2$, the arm F, the clamp-plate provided with means for giving the same an intermittent feed movement, and a latch operated by the clamp-plate to release a spring for moving the said arm F with the said spring, substantially as described.

10. The combination of a reciprocating needle, B, the needle-bar $b'$, the under needle-bar block, $b^2$, a clamp-plate having an intermittent feed movement, a latch operated by the movement of the clamp-plate against it to release a spring adapted to move said block $b^2$ laterally, and said spring, substantially as described.

11. The combination of the needle B, the needle-bar $b'$, the needle-block $b^2$, a spring constantly acting upon the needle-block $b^2$ to move it horizontally in one direction, a latch or similar holding device for holding the needle-bar in a given position in opposition to the stress of the spring, and means for moving the latch or holding device to release the needle-bar and permit the spring to move the needle-block, substantially as described.

12. The combination of the needle B, the needle-bar $b'$, the lever $b^3$, connected with the needle-bar $b'$ in a manner to permit of the horizontal movement of the bar in relation to the movable needle-block $b^2$, a spring bearing against the same, and a latch or lock for holding the needle-block in opposition to the stress of the spring, and devices for moving or actuating the latch or lock, substantially as described.

13. The combination of a clamp-plate provided with means for giving the same an intermittent feed movement, the movable needle-block $b^2$, the needle B and needle-bar $b'$, the arm $g$ upon the needle-block $b^2$, and the wedge-block G and holding-block G' thereon, with a slide-plate having the wedge-block $G^2$ and movable holding-block $G^3$, substantially as described.

14. The combination of the clamp-plate provided with means for giving the same an intermittent feed movement, the needle B, the needle-bar $b'$, the needle-block $b^2$, its arm $g$, the wedge-block G, the holding-block $G^3$, the slide-plate and the wedge-block $G^2$, a slide-block, $G^3$, and spring $g^3$, for moving the slide-block, substantially as described.

15. The combination of the movable under needle-bar block, $b^2$, the clamp-plate, a slide-plate, $e'$, the clamp-plate provided with means for giving the same an intermittent feed movement, and mechanism connecting the clamp-plate with the slide-plate $e'$, whereby the said slide-plate is adapted to be moved by the clamp-plate to release the needle-block $b^2$, and a device connecting the slide-plate with the block $b^2$, whereby upon the movement of the clamp-plate and release of the slide-plate $e'$ the under needle-bar block is returned to its original position, substantially as described.

16. The combination of the upper reciprocating eye-pointed needle, A, with the looping mechanism comprising the slide $m$, the block M, having the thread-engaging point $m'$, the pin $m^7$, carried by the slide $m$, the curved arm $m^4$, pivoted at $m^5$ and having the loop-spreading point $m^6$, and spring $m^3$, substantially as described.

17. The combination of the arm F, having the slot $f^3$, the stud $f^4$, the under needle-bar block, $b^2$, and the adjusting screws $f^5 f^6$, substantially as described.

18. The combination of the clamp-plate provided with means for giving the same an intermittent movement, the reciprocating upper needle, A, the reciprocating lower needle, B, the under needle-bar block, $b^2$, the upper looper, H, the lower looping devices, $m' m^6$, the upper take-up, N, and the lower take-up, O, as and for the purposes described.

JAMES H. REED.

In presence of—
F. F. RAYMOND, 2d,
J. M. DOLAN.